United States Patent
John et al.

(10) Patent No.: US 9,004,756 B2
(45) Date of Patent: Apr. 14, 2015

(54) TEMPERATURE SENSOR

(75) Inventors: Jay P. John, Chandler, AZ (US); David G. Morgan, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 491 days.

(21) Appl. No.: 13/443,720

(22) Filed: Apr. 10, 2012

(65) Prior Publication Data
US 2013/0266042 A1   Oct. 10, 2013

(51) Int. Cl.
*G01K 7/01* (2006.01)
(52) U.S. Cl.
CPC .................................... *G01K 7/01* (2013.01)
(58) Field of Classification Search
None
See application file for complete search history.

(56) References Cited

U.S. PATENT DOCUMENTS

| | | | | |
|---|---|---|---|---|
| 3,903,454 | A * | 9/1975 | Matsui et al. ............... | 315/307 |
| 4,142,115 | A * | 2/1979 | Nakata et al. ............... | 327/575 |
| 4,210,827 | A * | 7/1980 | Kanazawa et al. .......... | 327/306 |
| 4,224,537 | A | 9/1980 | Glazer | |
| 4,243,898 | A | 1/1981 | Seelbach | |
| 4,652,144 | A * | 3/1987 | Gunther et al. ............. | 327/512 |
| 5,253,938 | A * | 10/1993 | Stixrud ....................... | 374/173 |
| 6,255,891 | B1 | 7/2001 | Matsuno et al. | |
| 6,468,825 | B1 * | 10/2002 | Machida et al. ............. | 438/48 |
| 6,733,174 | B2 * | 5/2004 | Matsumoto et al. ........ | 374/178 |
| 6,882,213 | B2 | 4/2005 | Kim | |
| 6,906,399 | B2 | 6/2005 | Fruth et al. | |
| 6,934,209 | B2 * | 8/2005 | Marr .......................... | 365/211 |
| 6,980,062 | B2 | 12/2005 | Fujita | |
| 7,052,179 | B2 | 5/2006 | Tesi | |
| 7,161,440 | B2 | 1/2007 | Meltzer | |
| 7,167,058 | B2 | 1/2007 | Meltzer | |
| 7,283,008 | B2 | 10/2007 | Fujita | |
| 7,372,245 | B2 | 5/2008 | Ito et al. | |
| 7,507,023 | B2 | 3/2009 | Oyabe et al. | |
| 7,734,440 | B2 | 6/2010 | Hattis | |
| 7,773,446 | B2 | 8/2010 | Thorp et al. | |
| 7,890,054 | B2 | 2/2011 | Umeda et al. | |
| 7,901,134 | B2 | 3/2011 | Sudo | |
| 7,929,366 | B2 | 4/2011 | Chen | |
| 7,997,794 | B2 * | 8/2011 | Igarashi ...................... | 374/178 |
| 8,021,042 | B1 * | 9/2011 | Aslan et al. ................ | 374/178 |
| 8,033,721 | B2 * | 10/2011 | Ooe et al. ................... | 374/178 |
| 2002/0014675 | A1 | 2/2002 | Matsumoto et al. | |
| 2004/0062292 | A1 | 4/2004 | Pennock | |
| 2005/0128018 | A1 | 6/2005 | Meltzer | |
| 2006/0238186 | A1 | 10/2006 | Nishikawa et al. | |
| 2008/0242360 | A1 * | 10/2008 | Jang et al. .................. | 455/566 |

(Continued)

FOREIGN PATENT DOCUMENTS

JP     59030029 A  *  2/1984
JP   2002048651 A  *  2/2002

*Primary Examiner* — Gail Kaplan Verbitsky
(74) *Attorney, Agent, or Firm* — Quarles & Brady LLP

(57) ABSTRACT

A temperature sensor includes a constant current source and a transistor stack connected to the constant current source. The transistor stack includes a first transistor having a base connected to the constant current source and a collector coupled to a supply voltage. The collector of the first transistor is electrically isolated from the base of the first transistor. The transistor stack includes a second transistor connected to the first transistor. The second transistor has a collector connected to an emitter of the first transistor and has a base connected to the collector of the second transistor. The transistor stack includes an output node disposed between the constant current source and the base of the first transistor. A voltage of the output node is indicative of a temperature.

19 Claims, 4 Drawing Sheets

(56) References Cited

U.S. PATENT DOCUMENTS

| | | |
|---|---|---|
| 2008/0252360 A1 | 10/2008 | Yoshikawa |
| 2009/0033155 A1 | 2/2009 | Kanno et al. |
| 2009/0231044 A1 | 9/2009 | Iwaida et al. |
| 2010/0008398 A1* | 1/2010 | Nojima .................. 374/178 |
| 2010/0142256 A1 | 6/2010 | Kumar et al. |
| 2013/0235903 A1* | 9/2013 | Wong et al. ............ 374/178 |

* cited by examiner

US 9,004,756 B2

TEMPERATURE SENSOR

BACKGROUND

1. Field of Use

The present disclosure relates generally to an integrated circuit temperature sensor, and more specifically, to a temperature sensor implementation for isolated or triple well diode structures.

2. Related Art

Low cost and small size make semiconductor devices appealing components for use as temperature sensors. In the case of diodes or diode-connected bipolar junction transistor (BJT) devices, for example, a known voltage drop across the devices at a given temperature allow the devices to be incorporated into a number of temperature sensors.

In many temperature sensors, the sensor component is formed as a stack of two or more diodes or diode-connected BJTs, where the voltage drop across each diode or transistor is sensitive to temperature in a predictable manner. That variable voltage can be measured and translated into a corresponding sensed temperature. FIG. 1, for example, shows an ideal temperature sensor circuit formed using two diodes in a stacked configuration. As shown in FIG. 1, current source 10 supplies a known current Id into a first diode 12. The same current Id passes through diode 12 and enters diode 14, from which the current flows to ground. The circuit includes a node 16 from which a voltage (Vtemp) is measured.

The voltage drop across each of diodes 12 and 14 will vary based upon temperature as the forward voltage of each diode changes in response to ambient temperature. As a result, for a given temperature, the voltage drop across each of the ideal diodes 12 and 14 will be equal and at a predictable value. As a result, the voltage measured at node 16 will also vary predictably based upon the temperature of each of diodes 12 and 14. That voltage can then be measured and used to calculate the temperature of the sensor circuit. In some cases, to improve the resolution of the temperature sensor, additional diodes (e.g., three or more) may be connected in series.

In some real-world implementations of temperature sensors, such as those fabricated in isolated or triple wells in an integrated circuit, the diodes actually operate as part of a parasitic bipolar transistor device. As a result, the transistors actually amplify the current flowing through the temperature sensor by some amount. That amplification affects the device's measured voltage at node 16 resulting in inaccurate temperature readings.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
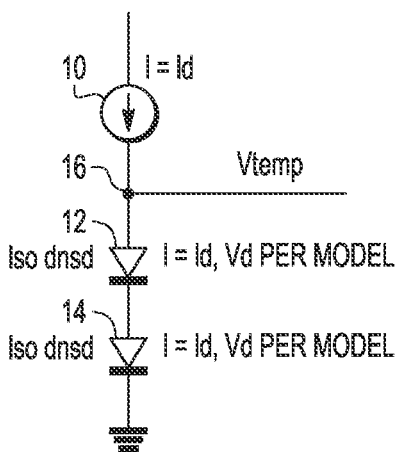
FIG. 1 illustrates an example of an ideal temperature sensor.

The present disclosure provides an integrated circuit temperature sensor, and more specifically, a temperature sensor implementation for isolated or triple well diode structures. At least some embodiments of the disclosure provide a temperature sensor that includes a constant current source and a transistor stack connected to the constant current source. The transistor stack includes a first transistor having a base connected to the constant current source and a collector coupled to a supply voltage. The collector of the first transistor is electrically isolated from the base of the first transistor. The transistor stack includes a second transistor connected to the first transistor. The second transistor has a collector connected to an emitter of the first transistor and has a base connected to the collector of the second transistor. The transistor stack includes an output node disposed between the constant current source and the base of the first transistor. A voltage of the output node is indicative of a temperature.

The disclosure also provides a temperature sensor including a constant current source, and a first transistor having a base connected to the constant current source. A collector of the first transistor is electrically isolated from the base of the first transistor. The sensor includes a second transistor having a collector connected to an emitter of the first transistor and having a base connected to the collector of the second transistor, and an output node disposed between the constant current source and the base of the first transistor. A voltage at the output node is at least partially determined by a temperature of the first transistor or the second transistor.

The disclosure also provides a temperature sensor including a transistor stack configured to connect to a constant current source. The transistor stack includes a first transistor having a base configured to connect to the constant current source and a collector configured to couple to a supply voltage. The collector of the first transistor is electrically isolated from the base of the first transistor. The transistor stack includes a plurality of other transistors, each having a collector and an emitter with a collector-emitter conduction path there-between and having a base that is connected to the collector. The collector-emitter conduction paths of the plurality of other transistors are connected in series between an emitter of the first transistor and a ground node.

The following detailed description is merely illustrative in nature and is not intended to limit the present disclosure, or the application and uses of the present disclosure. Furthermore, there is no intention to be bound by any expressed or implied theory presented in the preceding technical field, background, or the following detailed description. The present disclosure provides various examples, embodiments and the like, which may be described herein in terms of functional or logical block elements. It should be recognized that such block elements may be realized by any number of hardware elements configured to perform the specified function. For instance, one embodiment of the present disclosure may employ various integrated circuit elements such as memory elements, clock elements, logic elements, analog elements, or the like, which may carry out a variety of functions under the control of a microprocessor or another control device. Further, it should be understood that all elements described herein may be implemented including in silicon or another semiconductor material, another implementation alternative, or any combination thereof.

It should be recognized that conventional techniques and configurations related to gain stages, amplifier design, transistor biasing, current mirror circuits, voltage comparison circuits, differential amplifier circuits, logic circuits, analog-to-digital converter circuits, and other functional aspects of the circuits, elements and systems may not be described in detail herein. Furthermore, the connecting or coupling lines shown in the various figures contained herein are intended to represent example functional relationships, or connections or couplings between the various circuits or elements. It should be recognized that other alternatives, functional relationships, or connections or couplings may be present in a practical embodiment.

Throughout the specification and the claims, the following terms take at least the meanings explicitly associated herein, unless the context clearly dictates otherwise. The term "node" means any internal or external reference point, connection point, coupling point, junction, signal line, conductive element, or the like, at which a given signal, logic level, voltage, current, quantity, or the like is present. Furthermore, a plurality of nodes may be realized by one element and a plurality of signals may be multiplexed, modulated, or otherwise distinguished even though input or output at a common node. The term "circuit" means one or more elements, either active or passive, that are connected or coupled together to provide a desired function. The term "connected" means that one node, feature, circuit, or element is directly joined to or in communication with another node, feature, circuit, or element. The term "coupled" means that one node, feature, circuit, or element is directly or indirectly joined to or in communication with another node, feature, circuit, or element. Relational terms such as "first" and "second," and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a," "an," and "the" are intended to mean one or more unless specified otherwise or clear from the context to be directed to a singular form.

Figure 2:
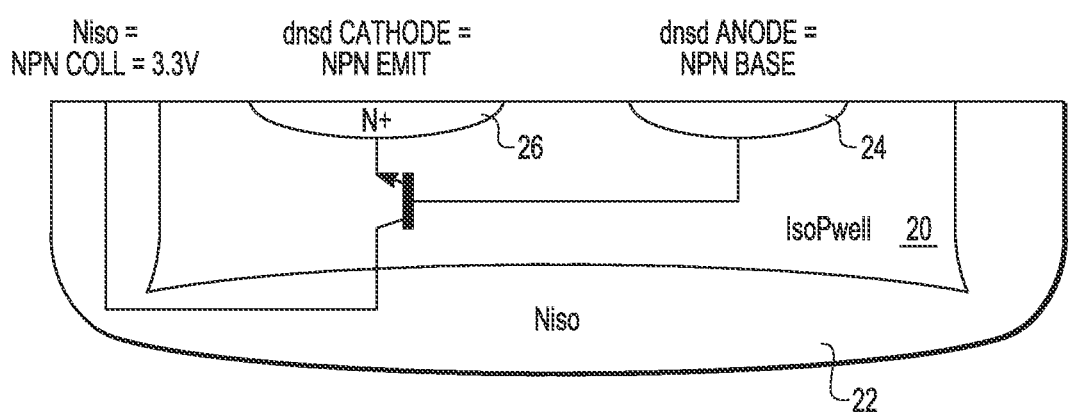
FIG. 2 shows a cross section of an example isolated diode structure formed in silicon or another semiconducting substrate.

In conventional temperature sensors, the sensor component is formed as a stack of two or more diodes or diode-connected BJTs, where the voltage drop across each diode or transistor is sensitive to temperature in a predictable manner. That variable voltage can be measured and translated into a corresponding sensed temperature. In many cases, though, the diodes of a conventional temperature sensor (see, for example, FIG. 1) are formed as part of a silicon integrated circuit formed within an isolated P-well structure. FIG. 2 shows a cross section of an example diode structure formed in silicon or another semiconducting substrate. Isolated P-well 20 is formed within N-type substrate 22. The diode structure includes P+ anode 24 and N+ cathode 26, each formed within P-well 20.

In the configuration shown in FIG. 2, the diode has a structure that actually operates as a bipolar junction transistor (BJT) with the diode anode 24 operating as the transistors base, the diode cathode 26 operating as the transistors emitter, and the N-type substrate 22 operating as the transistors collector. As a result, the diodes (elements 12 and 14) of the ideal temperature sensor of FIG. 1 in fact operate as parasitic BJTs when the circuit of FIG. 1 is implemented in a real device. To illustrate, FIG. 3 shows the temperature sensor circuit of FIG. 1 where the circuit has been redrawn to replace the ideal diodes with more accurate parasitic transistors.

Figure 3:
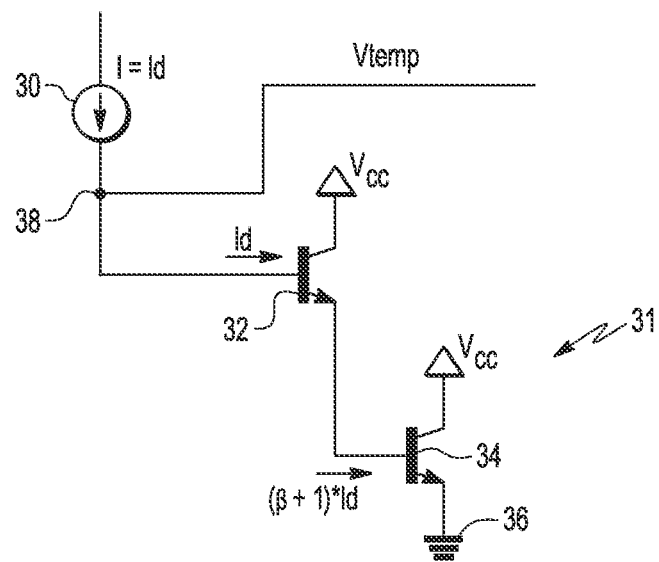
FIG. 3 is a circuit diagram showing the temperature sensor circuit of FIG. 1 where the circuit has been redrawn to replace the ideal diodes with an implementation using isolated diodes and showing resulting parasitic transistors.

In the temperature sensor 31 of FIG. 3, current source 30 is connected to the base of transistor 32. The emitter of transistor 32 is, in turn, connected to the base of transistor 34. The emitter of transistor 34 is connected to ground 36. The collectors of both transistors 32 and 34 are connected to a positive supply voltage (e.g., Vcc).

Current source 30 supplies a current Id to the base terminal of transistor 32. Id is generally selected to ensure that transistor 32 is forward biased within the ideal diode region during operation of the circuit. With Id supplied to the base of transistor 32, the emitter of transistor 32 generates an amplified output current equal to $(\beta+1)*Id$ where $\beta$ is equal to the current gain of the transistor. The amplified current is then fed into the base of transistor 34 causing transistor 34 to output a current of $(B+1)*(B+1)*Id$ at the transistors emitter. Accordingly, unlike in the ideal circuit shown in FIG. 1, the current that actually flows through the lower transistor 34 of FIG. 3 is amplified causing the current to differ significantly from the modeled current of Id in the ideal circuit.

To use the temperature sensor of FIG. 3, the current Id is supplied by current source 30, and a voltage is measured at node 38 of the circuit. The voltage measured at node 38 will vary in response to the varying voltage drop across each transistor, where the voltage drop is at least partially determined by the temperature of each transistor. Accordingly, given a known input current Id, the voltage measured at node 38 can be used to calculate a temperature of the device.

In this arrangement, though, the measured temperature may not accurately reflect the sensors temperature. The measured temperature at node 38 (Vtemp) will be somewhat higher than the measured temperature at node 16 of the ideal circuit (see FIG. 1) due to the increased current flowing through the lower transistor 34. The amount by which the current is increased is difficult to predict, as the current increase can vary based upon a number of factors including the bias current (Id), diode (or transistor) array size, temperature, and the value of $\beta$ of the transistor, which can all vary from one device to the next. As a result, it is difficult to accurately translate a voltage measured at node 38 into a temperature reading. Furthermore, the increase in current flowing through transistor 34 pushes the operating conditions of transistor 34 into the series resistance (Rs) dominated region of the device's current-voltage (IV) curve, which further reduces temperature sensitivity.

Accordingly, although the ideal temperature sensor circuit of FIG. 1 may allow for accurate temperature measurements, the actual operation of the circuit can result in inaccurate and unpredictable detected temperature values.

Figure 4:
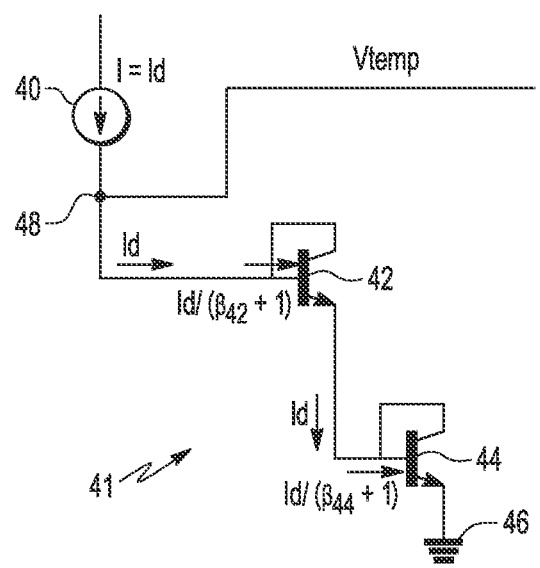
FIG. 4 is a circuit diagram showing a temperature sensor including a stack of transistors, where each transistor in the stack is diode-connected.

In alternative temperature sensor designs, the temperature sensor includes a stack of transistors, where each transistor in the stack is diode-connected. Such a temperature sensor 41 is shown in FIG. 4 and has a current source 40 connected to the base and collector of a first transistor 42. The emitter of the first transistor 42 is, in turn, connected to the base and collector of a second transistor 44. The emitter of the second transistor 44 is connected to ground 46. Because the first transistor 42 is diode connected, current source 40 supplies a current Id that is divided across the transistor's collector and base. The base current of diode-connected first transistor 42 is reduced to $Id/(\beta_{42}+1)$ where $\beta_{42}$ is equal to the current gain of the first transistor 42. The base current of diode-connected second transistor 44 is similarly reduced to $Id/(\beta_{44}+1)$ where $\beta_{44}$ is equal to the current gain of the second transistor. To use the temperature sensor 41, the current Id is supplied by current source 40, and a voltage is measured at node 48 of the circuit. In this arrangement, though, because both transistors 42 and 44 are diode connected, the current flowing through the transistors is significantly reduced. The amount of reduction is determined by the absolute value of $\beta$ of of the transistors 42 and 44 which can vary greatly from one device to the next, making calibration of the device very difficult. As a result, accurate temperature readings with the circuit shown in FIG. 4 are not readily achievable. To achieve accurate readings, the absolute value of $\beta$ for each of the transistors 42 and 44 of the temperature sensor 41 must be accurately controlled. Unfortunately, accurate control of the absolute value of $\beta$ within a particular transistor is not feasible using conventional manufacturing processes.

Accordingly, in many temperature sensors designs, where the diodes of the sensor stack actually operate as parasitic BJT devices, the $\beta$ of the parasitic NPN junctions within the BJTs cause a difficult to predict variation in the current injected into the diodes of the stack. This unpredictable variation severely degrades the sensitivity of the temperature sensors. Exacerbating this problem, triple well structures are common in copper metal oxide semiconducting (CMOS) platforms and device scaling will tend to result in an even larger parasitic $\beta$.

In the present disclosure, a sensor circuit is presented that allows the current flowing through the diode or transistor stack to be amplified through the first diode or transistor in the sensor stack but thereafter divided down through the second (and subsequent) diode or transistor in the diode stack. As a result, the intended current flowing through the diode or transistor stack is maintained at a desired level, thus allowing for more accurate temperature readings (by increasing a voltage drop across the diode or transistor stack). This implementation relies somewhat upon $\beta$ matching between each diode (or BJT) in the diode or transistor stack. But $\beta$ matching between devices in a single sensor stack is more easily controlled than general $\beta$ variation across devices. This approach also improves the sensors sensitivity by potentially avoiding high resistance operation of the device, where temperature sensitivity is relatively low. In the present disclosure the term 'transistor' is understood to refer to conventional transistor (e.g., BJT) devices as well as diode devices that, due to the method of their construction (as described above), actually operate as parasitic transistor devices.

Figure 5:
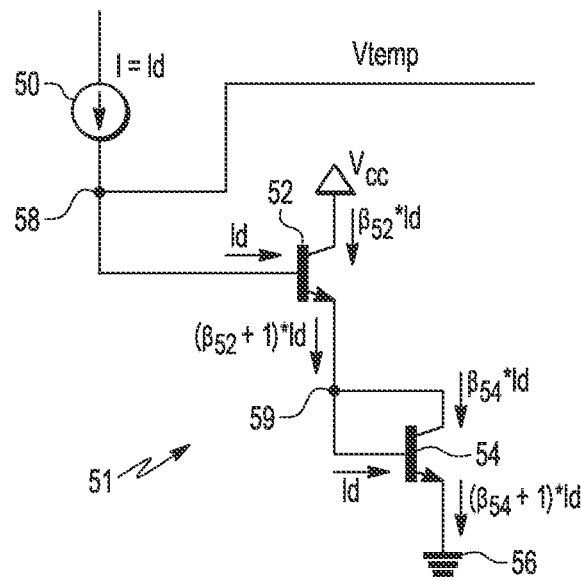
FIG. 5 is a schematic showing an embodiment of a temperature sensor in accordance with the present disclosure.

FIG. 5 is a schematic showing an embodiment of a temperature sensor 51 in accordance with the present disclosure. In the temperature sensor 51, an energy source such as a current source 50 is connected to a transistor stack comprising transistors 52 and 54. Specifically, current source 50 is connected to the base of a first transistor 52. The emitter of the first transistor 52 is, in turn, connected to the base and collector of a diode-connected second transistor 54. The emitter of the second transistor 54 is connected to ground 56. The collector of the first transistor 52 is connected to a positive supply voltage (e.g., Vcc). The second transistor 54 is diode connected with the collector and base being connected together.

Transistors 52 and 54 have $\beta$ values that are substantially equal. As discussed above, although it can be difficult to control the absolute value of $\beta$ within a particular device (anomalies occurring during the fabrication process can cause the value of $\beta$ to vary between devices), within a particular device, although the value of $\beta$ may not be known accurately, the $\beta$ values for different components can be relatively easily matched to one another. For example, in a conventional fabrication process the value of $\beta$ among a number of transistors within the same device may not vary by more than approximately 5%. In one implementation of the present system, though, the $\beta$ values of transistors 52 and 54 are within approximately 20% of one another.

Current source 50 of the device supplies a current Id to the base terminal of the first transistor 52. The magnitude of current Id is generally selected to ensure that the first transistor 52 is forward biased during operation of the temperature sensor 51. With current Id supplied to the base of the first transistor 52, the transistors emitter generates an amplified output current equal to $(\beta_{52}+1)*Id$ where $\beta_{52}$ is equal to the current gain of the first transistor 52.

The current outputted by the emitter of the first transistor 52 is then divided as the current is introduced into the second transistor 54. Because the second transistor 54 is diode connected, the current inputted into node 59 by the first transistor 52 is divided across the second transistor's 54 base and collector. As shown in FIG. 5, after division, the current entering the base of the second transistor 54 is equal to the current Id at the output of the current source 50, and the current entering the collector of the second transistor 54 is equal to $\beta_{54}*Id$, where $\beta_{54}$ is the current gain of the second transistor 54. Therefore, as a result of the current division, the current entering both the base and collector of the second transistor 54 is equal to the current entering both the base and collector of the first transistor 52. This operation presumes that the values of $\beta$ for the first and second transistors 52 and 54 are well matched, as described above.

To use the temperature sensor 51, the current Id is supplied by current source 50, and a voltage is measured at node 58 of the circuit. The voltage measured at node 58 will vary in response to the varying voltage drop across each transistor, where the voltage drop is at least partially determined by the temperature of each transistor. Accordingly, given a known input current Id, the voltage measured at node 58 can be used to calculate a temperature of the device in which the sensor is employed.

In the circuit arrangement shown in FIG. 5, the measured voltage at node 58 more accurately models that of the ideal circuit (e.g., FIG. 1) because the current flowing through both the first transistor 52 and the second transistor 54 is as expected due the lack of current amplification seen in the conventional circuit of FIG. 3. Because the $\beta$ values of each transistor are matched, the current division occurring at the collector and base of the diode-connected second transistor 54 causes the same current (Id) to be introduced into the base of each transistor. This prevents the amplification of current found in conventional circuits and allows for more accurate conversion of the voltage measured at node 58 into a measured temperature.

Although in the present system $\beta$ matching between transistors is important, the absolute value of $\beta$ of each transistor is not important. As such, conventional fabrication techniques that allow for relatively accurate matching of $\beta$ between transistors but do not allow for the accurate selection of a particular $\beta$ value for transistors within a device, can be used to fabricate the present temperature sensor 51.

Figure 6:
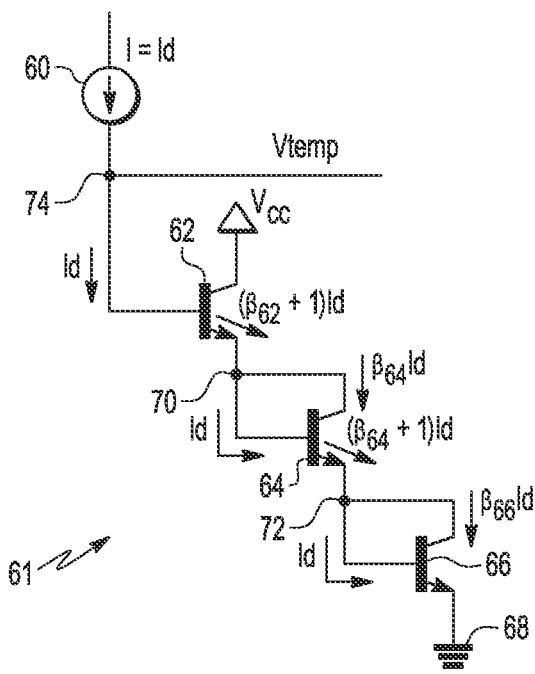
FIG. 6 is a schematic showing an embodiment of a temperature sensor in accordance with the present disclosure having a sensor stack including three transistors, where only the second and third transistors are diode-connected.

Depending upon the implementation of the present temperature sensor any number of diode-connected transistors may be connected in series within the transistor stack. In some embodiments, it is only necessary that the first transistor in the stack not be diode connected. In that arrangement, the current supplied by a connected current source (e.g., Id) flows through all transistors in the sensor stack, as described above. For example, FIG. 6 shows an implementation of the present sensor circuit wherein the sensor stack includes three transistors, where only the second and third transistors are diode-connected. In other implementations, any number of transistors may be used in the temperature sensor where the first transistor is not diode-connected, but the remaining transistors are all diode-connected.

In the temperature sensor 61 in FIG. 6, a current source 60 is connected to the base of a first transistor 62 that has a collector connected to a positive supply voltage (e.g., Vcc). The emitter of the first transistor 62 is, in turn, connected to the base and collector of a diode-connected second transistor 64. The emitter of the second transistor 64 is connected to the base and collector of a diode-connected third transistor 66. The emitter of the third transistor 66 is connected to a ground node 68. The second and third transistors 64 and 66 each have a collector-emitter conduction path formed between their collector and emitter. The collector-emitter conduction paths of the second and third transistors 64 and 66 are connected in series between the emitter of the first transistor 62 and the ground node 68.

Transistors 62, 64, and 66 each have $\beta$ values that are approximately equal. Because the $\beta$ values are approximately equal, the $\beta$ values are considered 'matched.' As discussed above, although it can be difficult to control the absolute value of $\beta$ within a particular device (anomalies occurring during the fabrication process can cause the value of $\beta$ to vary between devices), within a particular device the $\beta$ values for different components can be relatively easily matched to one another. For example, in a conventional fabrication process the value of $\beta$ among a number of transistors within the same device may not vary by more than approximately 5%. In one implementation of the present system, though, the $\beta$ values of transistors 62, 64, and 66 are within approximately 20% of one another.

Current source 60 of the temperature sensor 61 supplies a current Id to the base terminal of the first transistor 62. The magnitude of current Id is generally selected to ensure that the first transistor 62 is forward biased in the ideal diode region during operation of the circuit. With Id supplied to the base of the first transistor 62, the emitter of the first transistor 62 generates an amplified output current equal to $(\beta_{62}+1)*Id$ where $\beta_{62}$ is equal to the current gain of the first transistor.

The current outputted by the emitter of the first transistor 62 is then divided as the current is introduced into the second transistor 64. Because the second transistor 64 is diode connected, the current inputted into node 70 by the first transistor 62 is divided across the second transistors base and collector. As shown in FIG. 6, after division, the current entering the base of the second transistor 64 is equal to Id, and the current entering the collector of the second transistor is equal to $\beta_{64}*Id$, where $\beta_{64}$ is the current gain of the second transistor. Therefore, as a result of the current division, the current entering both the base and collector of the second transistor 64 is equal to the current entering both the base and collector of the first transistor 62. The current outputted by the emitter of the second transistor 64 is then equal to $(\beta_{64}+1)*Id$.

That current emitted by the second transistor 64 is then divided as the current is introduced into the third transistor 66. Because the third transistor 66 is diode connected, the current inputted into node 72 by the second transistor 64 is divided across the third transistor's base and collector. As shown in FIG. 6, after division, the current entering the base of the third transistor 66 is equal to Id, and the current entering the collector of the third transistor is equal to $\beta_{66}*Id$, where $\beta_{66}$ is the current gain of the third transistor.

If the $\beta$ values for each of transistors 62, 64, and 66 are matched, the current flowing through each of transistors 64 and 66 is well matched to that of the ideal circuit (i.e., incorporating ideal diodes) and predictable, allowing for accurate operation of the temperature sensor.

To use the temperature sensor 61, the current Id is supplied by current source 60, and a voltage is measured at node 74 of the circuit. The voltage measured at node 74 will vary in response to the varying voltage drop across each transistor, where the voltage drop is at least partially determined by the temperature of each transistor. Accordingly, given a known input current Id, the voltage measured at node 74 can be used to calculate a temperature of the device.

The implementation of a temperature sensor in accordance with the present disclosure allows for more predictable variation of the measured voltage Vtemp based upon temperature. By diode connecting all but the first transistor in a transistor stack, uncertainty in the value of $\beta$ for particular transistors does not affect the accuracy of temperature measurements. The present system requires relatively accurate matching of $\beta$ between particular transistors within the device, which is feasible using conventional and well-known fabrication processes.

Figure 7:
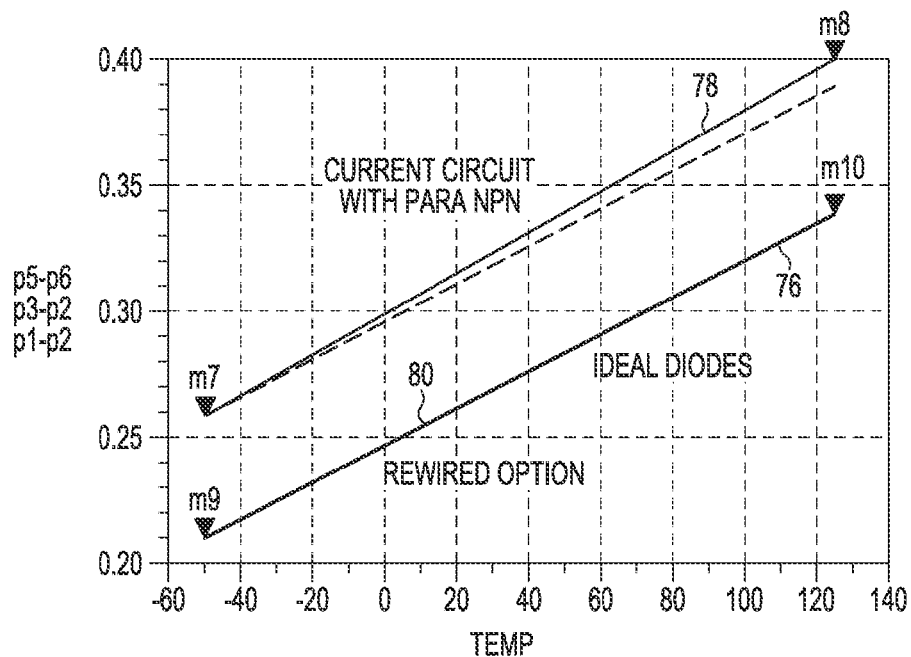
FIG. 7 is a graph showing simulation results that demonstrate the improved performance of the present temperature sensor circuit.

FIG. 7 is a graph showing simulation results that demonstrate the improved performance of the present temperature sensor circuit over other conventional circuits. Temperature is shown along the x-axis, while the corresponding measured voltage is shown along the y-axis. As shown on FIG. 7, line 76 shows the voltage-temperature curve for the ideal temperature sensor circuit (e.g., shown in FIG. 1). Line 78 shows the voltage-temperature curve for a conventional temperature sensor (e.g., shown in FIG. 3). As seen in FIG. 7, line 78 is offset above line 76, resulting in a given temperature generating a higher measured Vtemp in the conventional temperature sensor than the model circuit. The higher voltage results from the amplified current that flows through the lower transistor. As discussed above, the amount by which line 78 (conventional sensor) differs from line 76 (ideal circuit) is difficult to predict because the absolute value of $\beta$ for the transistors in the conventional device are difficult to control using conventional fabrication processes.

Line 80 shows the voltage-temperature curve for a circuit arranged in accordance with the present disclosure (e.g., as shown in FIG. 5 or 6). Note that the simulation shown in FIG. 7 presumed perfect $\beta$ matching between the transistors of the temperature sensor. As seen in FIG. 7, line 80 overlaps with the voltage-temperature curve 76 of the ideal circuit. Although the simulation assumes perfect $\beta$ matching, as discussed above, accurate $\beta$ matching is achievable using conventional fabrication techniques. As a result, the present temperature sensor circuit provides substantial advantage over conventional circuit designs.

Figure 8:
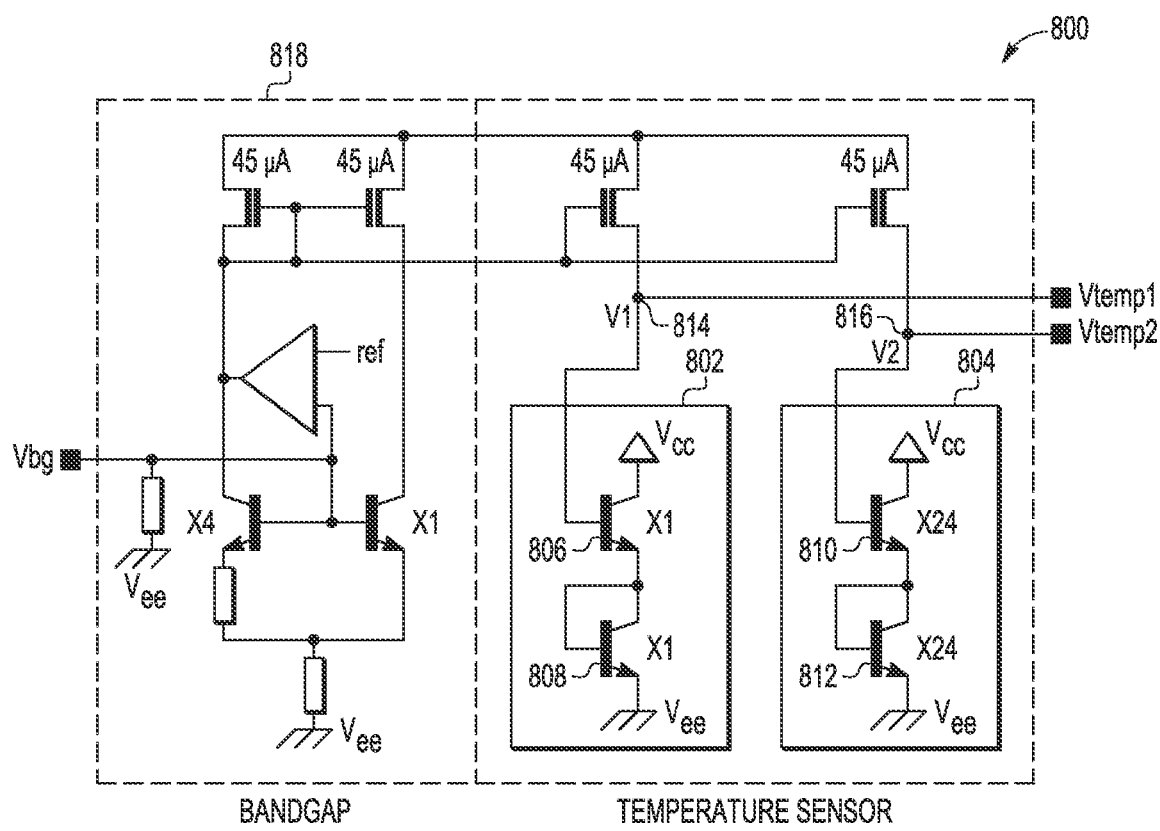
FIG. 8 is a circuit diagram showing one implementation of the present temperature circuit design.

FIG. 8 is a circuit diagram showing one implementation of the present temperature circuit design. In FIG. 8, circuit 800 includes two separate temperature sensing circuit structures or transistor stacks 802 and 804. Sensor 802 includes a first, non-diode connected transistor 806 connected in series with a second, diode-connected transistor 808 to form a first transistor stack. Specifically, the emitter of the first transistor 806 is connected to both the collector and base of the second transistor 808. The collector of the first transistor 806 is connected to a supply voltage (e.g., Vcc) and the emitter of the second transistor 808 is connected to a ground. Node 814 is connected to the base of the first transistor 806 and allows for a measurement of a first reference voltage Vtemp1. As discussed above, the voltage Vtemp1 can be converted into a sensed temperature.

The second temperature sensing structure or transistor stack 804 includes two, similarly-connected third and fourth transistors 810 and 812. Specifically, the emitter of the third transistor 810 is connected to both the collector and base of the fourth transistor 812. The collector of the third transistor 810 is connected to a supply voltage (e.g., Vcc) and the emitter of the fourth transistor 812 is connected to a ground. Node 816 is connected to the base of the third transistor 810 and allows for a measurement of a first reference voltage Vtemp2. As discussed above, the voltage Vtemp2 can be converted into a sensed temperature.

Although both sensor circuits 802 and 804 only include a single diode-connected transistor in the sensor stack, in other implementations, any number of diode-connected transistors may be connected in series in each sensor circuit, where the first transistor is not diode connected, as discussed above.

As depicted in FIG. 8, a bandgap circuit 818 is connected to each of temperature sensors 802 and 804 to supply a constant current (e.g., Id) to each temperature sensor. In various implementations, bandgap circuit 818 may be replaced by any other circuit configured to supply a constant current to each of temperature sensors 802 and 804.

Each of sensor circuit 802 and 804 may be fabricated within semiconductor substrate so that the transistors of each circuit have different sizes. For example, as shown in FIG. 8, the size of the first temperature sensor 804 is approximately 24 times greater than the size of the second temperature sensor 802. This difference in size may be achieved, for example, by replacing the third transistor 810 with 24 similarly constructed transistors connected in parallel and replacing the fourth transistor 812 with 24 similarly constructed transistor also connected in parallel. Because the area of transistors in each of sensors 802 and 804 varies, the measured voltages Vtemp1 and Vtemp2 will also vary from one another. That difference value can then be used to calculate a temperature sensed by each of sensors 802 and 804.

Although the present disclosure describes specific examples, embodiments, and the like, various modifications and changes can be made without departing from the scope of the present disclosure as set forth in the claims below. For example, although the exemplary methods, devices, and systems described herein are in conjunction with a configuration for the aforementioned comparators, the skilled artisan will readily recognize that the exemplary methods, devices, and systems may be used in other methods, devices, and systems and may be configured to correspond to such other exemplary methods, devices, and systems as needed. Further, while at least one embodiment has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims.

What is claimed is:

1. A temperature sensor, comprising:
a constant current source;
a transistor stack connected to the constant current source, the transistor stack including:
a first transistor having a base connected to the constant current source and a collector coupled to a supply voltage, the collector of the first transistor being electrically isolated from the base of the first transistor, and
a second transistor connected to the first transistor, the second transistor having a collector connected to an emitter of the first transistor and having a base connected to the collector of the second transistor; and
an output node disposed between the constant current source and the base of the first transistor, wherein a voltage of the output node indicates a temperature of the transistor stack.

2. The temperature sensor of claim 1, wherein a current gain of the first transistor is matched to a current gain of the second transistor.

3. The temperature sensor of claim 2, wherein the current gain of the first transistor is within 20% of the current gain of the second transistor.

4. The temperature sensor of claim 1, wherein the transistor stack includes a third transistor having a collector connected to an emitter of the second transistor, and including a base connected to the collector of the third transistor.

5. The temperature sensor of claim 4, wherein a current gain of the first transistor is matched to a current gain of the second transistor and a current gain of the second transistor is matched to a current gain of the third transistor.

6. The temperature sensor of claim 5, wherein the current gain of the second transistor is within 20% of the current gain of the third transistor.

7. The temperature sensor of claim 1, wherein the first and second transistors include diodes operating as parasitic bipolar transistor devices.

8. The temperature sensor of claim 1, wherein the first transistor or second transistor includes a triple well diode structure.

9. The temperature sensor of claim 1, including a second transistor stack connected to the constant current source, the second transistor stack including:
a third transistor having a base connected to the constant current source and a collector coupled to a second supply voltage, the collector of the third transistor being electrically isolated from the base of the third transistor, and
a fourth transistor connected to the third transistor, the fourth transistor having a collector connected to an emitter of the third transistor and having a base connected to the collector of the fourth transistor; and
a second output node disposed between the constant current source and the base of the third transistor, wherein a second voltage of the second output node indicates a temperature of the second transistor stack.

10. The temperature sensor of claim 9, wherein the transistor stack is a different size from the second transistor stack and the voltage of the output node of the transistor stack is different from the second voltage of the second output node of the second transistor stack when the temperature of the transistor stack is equal to the temperature of the second transistor stack.

11. A temperature sensor, comprising:
a constant current source;
a first transistor having a base connected to the constant current source, a collector of the first transistor being electrically isolated from the base of the first transistor, and
a second transistor having a collector connected to an emitter of the first transistor and having a base connected to the collector of the second transistor; and an output node disposed between the constant current source and the base of the first transistor, wherein a voltage at the output node is at least partially determined by a temperature of the first transistor or the second transistor.

12. The temperature sensor of claim 11, wherein a current gain of the first transistor is matched to a current gain of the second transistor.

13. The temperature sensor of claim 12, wherein the current gain of the first transistor is within 20% of the current gain of the second transistor.

14. The temperature sensor of claim 11, including a third transistor having a collector connected to an emitter of the second transistor, and including a base connected to the collector of the third transistor.

15. The temperature sensor of claim 14, wherein a current gain of the first transistor is matched to a current gain of the second transistor and a current gain of the second transistor is matched to a current gain of the third transistor.

16. The temperature sensor of claim 15, wherein the current gain of the second transistor is within 20% of the current gain of the third transistor.

17. The temperature sensor of claim 11, wherein the first and second transistor include diodes operating as parasitic bipolar transistor devices.

18. A temperature sensor, comprising:
a transistor stack configured to connect to a constant current source, the transistor stack including:
a first transistor having a base configured to connect to the constant current source and a collector configured to couple to a supply voltage, the collector of the first transistor being electrically isolated from the base of the first transistor, and
a plurality of other transistors, each having a collector and an emitter with a collector-emitter conduction path there-between and having a base that is connected to the collector, wherein the collector-emitter conduction paths of the plurality of other transistors are connected in series between an emitter of the first transistor and a ground node, wherein a voltage produced at the base of the first transistor indicates a temperature value.

19. The temperature sensor of claim 18, wherein a current gain of each of the first transistor and the plurality of other transistors are each matched.

* * * * *